2,771,158
Patented Nov. 20, 1956

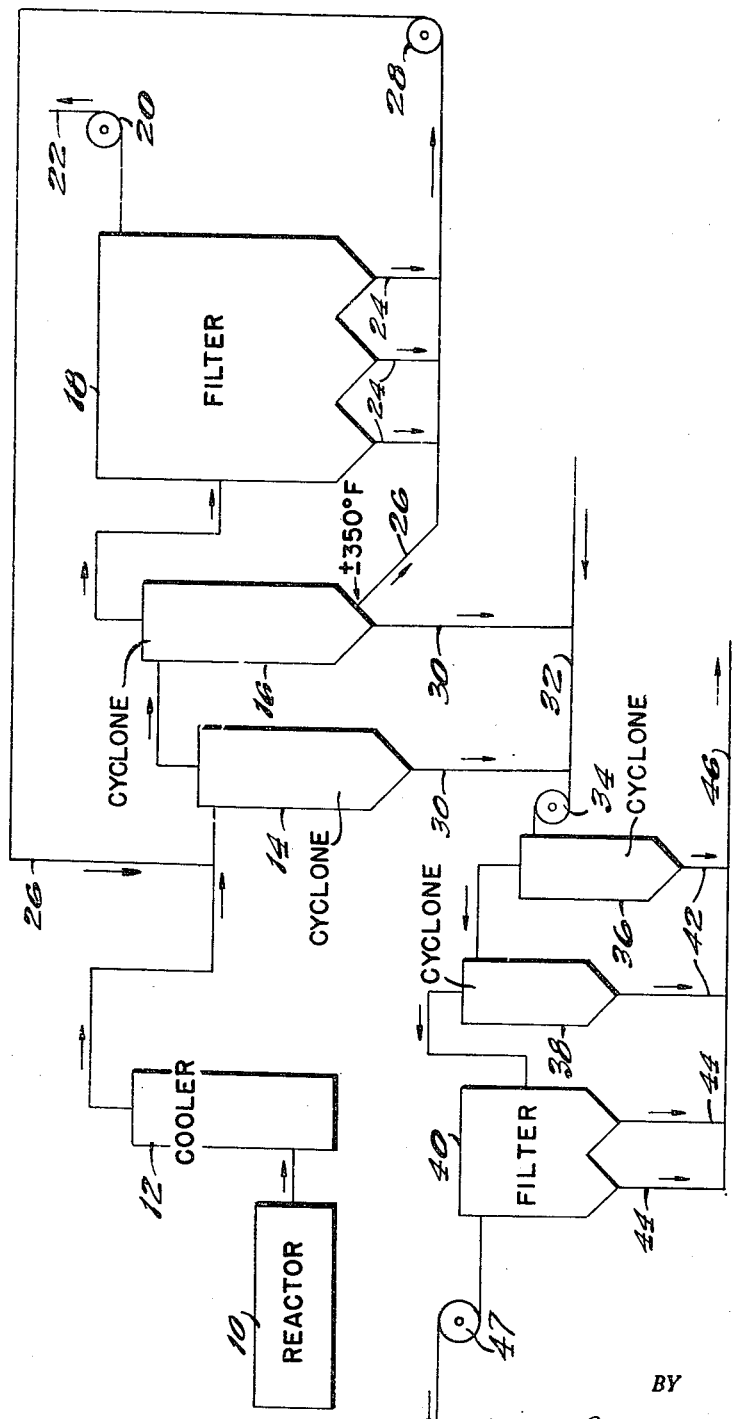

2,771,158

RECOVERY OF PIGMENTS FROM AEROSOLS

Richard I. Bray, Franklin, La., and Randolph Antonsen, Boston, Mass., assignors to Godfrey L. Cabot, Inc., Boston, Mass., a corporation of Massachusetts Application June 30, 1953, Serial No. 365,020

6 Claims. (Cl. 183—122)

This invention relates to the recovery of pigments from aerosol and is particularly adapted to the separation of carbon black from gaseous reaction products in which suspended.

For many years the collection of carbon black produced in furnaces has been accomplished by conventional apparatus, usually including some type of cooler followed by an electrical precipitator and several cyclone separators in series. In addition, auxiliary cleanup equipment such as wet scrubbers, bag filters and the like have been employed to remove the last traces of carbon black from the tail gases. This conventional equipment has also been adapted to the recovery of other finely-divided solids from the gases in which they are suspended, such, for example, as metal oxides when produced in a gaseous atmosphere.

An aerosol is a gaseous suspension of particles which will not settle out or at least settle only very slowly under existing conditions. It is evident, therefore, that the particles must be very small and widely separated from one another. In the case of carbon black, for example, the particulate carbon has an average diameter of less than 100 millimicrons and may be as small as 15 millimicrons. Such finely divided materials can not satisfactorily be collected by cyclonic separation alone nor alone by most filters known today except at considerable expense.

Because of the difficulty involved in collecting small particles, the electrical precipitator has been almost universally used in aerosol collection systems to cause agglomeration of particles into larger aggregates which can then be removed from the gas stream in cyclone separators. And even when employing electrical precipitation prior to cycloning considerably less than 100% collection can be achieved.

We have discovered that substantially complete collection of finely divided materials from aerosols can be achieved at much less expense than with prior known apparatus and processes by the practice of our invention and such high collection efficiency is achieved without the use of electrical precipitation by a novel combination of known units of apparatus. Furthermore, by the practice of this invention both collection procedure and equipment are simplified and are more effectively utilized.

Accordingly it is the principal object of our invention to provide new and improved process for the collection of finely divided solids from aerosols that may be advantageously carried out without requiring the employment of electrical precipitation.

It is a further object of this invention to provide a system for agglomerating and recovering substantially the entire solids content of reaction product gases by cyclonic separation.

The process of our invention is characterised by the steps of continuously delivering the aerosol to a zone of cyclonic separation, and continuously increasing the grain loading of aerosol as it is delivered for cyclonic treatment. This procedure is best carried out by re- cycling a portion of the solids content of the original aerosol. For example, the attenuated effluent of the cyclonic step may be filtered in any desired manner and the solid particles so recovered recycled to the original aerosol before it reaches the cyclone separator.

These and other features and advantages of the invention will be best understood and appreciated from the following description of an illustrative manner in which it may be carried out as suggested in the acompanying drawing, in which the apparatus is indicated as a flow-sheet diagram.

The aerosol is generated in reactor 10 which may be a carbon black furnace and, when the reaction involves high temperatures, the aerosol is passed through a cooler 12 where the reaction products are cooled by water sprays or other suitable means. The cooler may be omitted if the temperature of the reaction products is not too high for proper handling in subsequent stages of collection. The aerosol then enters a cyclone separator 14 in which the greater proportion of its solid constituent is recovered as will hereinafter appear. The effluent from cyclone 14 passes into cyclone 16 in which further separation occurs. Additional cyclones may be included in the series between those numbered 14 and 16, and in fact we have found that for best results at least three cyclones and preferably four should be employed.

The attenuated aerosol leaving the last cyclone 16 of the series is very dilute and the major proportion thereof which is discharged from the top of the cyclone in the conventional manner is conducted to a filter 18 which may be of the bag, louver or any other convenient type. The residual solid carbon black is completely separated from the gases in filter 18 and the gases are discharged to the atmosphere through a fan 20 and stack 22.

Although the aerosol entering filter 18 is relatively dilute it still contains an appreciable proportion of solid constituent. These solid particles are separated from the gases by the filter medium and drop out of the filter through conduits 24 into a main transport pipe 26 through which they are gas conveyed and recirculated to the inlet of primary cyclone 14.

Gas transport is provided as follows. A minor proportion of the aerosol is withdrawn from one or more of the cyclones in the series but preferably from the last cyclone 16 through a duct 26 which leads from the lower section of the cyclone and this portion of the aerosol, which is principally gaseous, is thus utilized to pick up and transport the solid particles recovered from filter 18. Since the gases must necessarily be reintroduced into the collection system it is evident that only gases which are inert with respect to the system can be used. Hence the recycling of reaction product gases is particularly advantageous. A fan 28 serves to draw the gases through pipe 26.

As the solid particles recovered in the filter are introduced into the primary cyclone 14 along with that produced in the reaction it will be evident that the grain loading of the gases therein will be substantially increased, provided of course that the volume of gas withdrawn from cyclone 16 is not excessive. Consequently, the incidence of collision between individual solid particles is enhanced and a large proportion of these particles will form agglomerates of sufficient size to be recovered by cyclonic treatment and, in fact, by reason of the closed system, it will be seen that final recovery of the solid product is achieved in cyclones 14 and 16.

The product drops out of the cyclones through conduits 30 which discharge into a main line 32, which may be a screw conveyor, or which, as here shown, is a gas transport line supplied with air from fan 34. When a screw conveyor is used the product will be conducted directly to storage or after treatment such as pelletization. When air transport is used the newly created and heavily loaded aerosol is passed through additional cyclone separators 36 and 38 and into filter 40 whence the product is discharged through drops 42 of the cyclones and 44 of the filter to discharge conduit 46. The effluent gases are drawn through the filter 40 and discharged to the atmosphere by a fan 47.

While it is obvious that the process and apparatus of this invention are adapted to the recovery of any finely divided solids from aerosols, such for example as suspensions of melted oxides, it has been illustrated and described with specific reference to the collection of furnace carbon black.

Having thus disclosed our invention and described in detail an illustrative manner in which it may be carried out, we claim as new and desire to secure by Letters Patent:

1. A process for recovering finely-divided solids from aerosols comprising the steps of flowing the aerosol through a series of cyclonic separation zones, thereby separating in each zone a portion of the solids content of the aerosol, separating the attenuated aerosol leaving the last of the series of cyclonic separation zones into portions of unequal volume, conducting the portion of larger volume to a filtration zone and taking up the solids discharge of the filtration zone in the smaller volume portion of the aerosol, separating substantially all of the remaining solids from the aerosol in the filtration zone and discharging the separated solids into the aerosol stream thereby increasing the solids content of said aerosol, conducting the aerosol thus loaded to the first of the series of cyclonic separation zones, thereby increasing the grain loading of the aerosol being treated, and recovering the solids separated therein from the cyclonic separation zones.

2. The process of claim 1 in which the aerosol solid is carbon black produced in a furnace process.

3. The process of claim 1 in which the aerosol solid is metal oxide produced in a furnace process.

4. A process for recovering finely divided solids from aerosols comprising the steps of flowing the aerosol through a series of cyclonic separation zones, separating in each such zone a portion of the solids content of the aerosol, and discharging the major proportion of the attentuated aerosol from the last in the series of cyclonic separation zones into a filtration zone, therein separating substantially all of the solid content of the aerosol from its gaseous constituent, and discharging said solid content therefrom; withdrawing a minor proportion of aerosol from at least one cyclonic separation zone and conducting it to the discharge area of the filtration zone, suspending the solids discharged from the filtration zone in said aerosol and conducting said suspension to the first of the series of cyclonic separation zones, thereby increasing the grain loading therein, and recovering the solids separated from the gases in the cyclonic separation zones.

5. The process of claim 4 further characterized by suspending the solids recovered from the cyclonic separation zones in an air stream and subsequently separating the solids therefrom in cyclonic separation and filtration zones.

6. A process for recovering finely-divided solids from aerosols comprising the steps of flowing the aerosol through a series of cyclonic separation zones, thereby separating in each zone a portion of the solids content from the aerosol, conducting one portion of the attenuated aerosol from the last of the series of cyclonic separation zones to a filtration zone and another portion of the aerosol to the solids discharge of the filtration zone, taking up the discharge solids from the filtration zone in the said other portion of the aerosol thereby increasing the solids content of said portion, conducting the thus loaded portion of the aerosol to one of the series of cyclonic separation zones thereby increasing the grain loading of the aerosol being subject to cyclonic separation, and recovering the solids separated therein from the cyclonic separation zones.

References Cited in the file of this patent

UNITED STATES PATENTS

| 940,076 | Seaver | Nov. 16, 1909 |
| 2,391,863 | Bowen | Jan. 1, 1946 |
| 2,411,208 | Hall et al. | Nov. 19, 1946 |
| 2,548,332 | Alexander et al. | Apr. 10, 1951 |
| 2,614,653 | Penick et al. | Oct. 21, 1952 |

FOREIGN PATENTS

| 504,459 | Belgium | July 31, 1951 |
| 719,040 | France | Feb. 1, 1932 |